June 7, 1932.   W. A. BERGSTROM   1,861,833
SELF LOCKING NUT
Filed Feb. 6, 1931
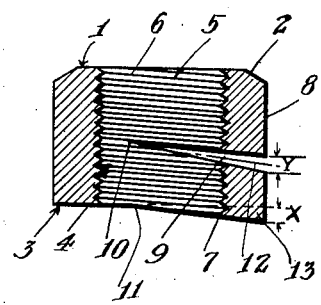
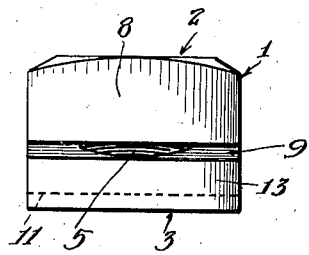
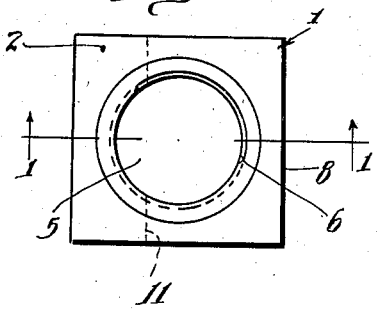
Inventor
William A. Bergstrom
By
Attorneys Patented June 7, 1932

1,861,833

UNITED STATES PATENT OFFICE

WILLIAM A. BERGSTROM, OF LOS ANGELES, CALIFORNIA, ASSIGNOR TO NANFELDT CORPORATION, LTD., OF LOS ANGELES, CALIFORNIA, A CORPORATION OF CALIFORNIA

SELF LOCKING NUT

REISSUED

Application filed February 6, 1931. Serial No. 513,877.

My invention relates to self-locking nuts and has particular reference to a bolt nut which when in place upon an element to be secured thereby is distorted from its normal shape to thereby cause the nut to be secured against loosening under vibration.

It is an object of my invention therefore, to provide a self-locking nut of the character described in which the nut is originally formed with a depressed portion upon its lower face and is provided with a slot or opening permitting the depressed portion to be distorted to lock the nut upon a bolt.

Another object of my invention is to provide a self-locking nut in which the slot or opening has a configuration substantially corresponding to the configuration of the depression on its lower face so that when in place the opening is closed and the nut is locked.

Another object of my invention is to provide a self-locking nut in which the lower face thereof is provided with a portion substantially at right angles to the axis of the bore through the nut, while the remaining portion of the lower face is formed at an outwardly inclined angle to the remaining portion and in which a laterally extending slot is provided entering the bore of such shape and dimensions as will permit closing of the slot upon depression of the angular portion of the face.

My invention will be described with reference to the accompanying drawing, wherein Figure 1 is a sectional view taken along lines I—I of Figure 3 and illustrating the construction of a self-locking nut embodying my invention.

Figure 2 is a side elevational view of the nut illustrated in Figure 1, and

Figure 3 is a plan view of the nut illustrated in Figure 1.

Referring to the drawing, it will be observed that I have provided a self-locking nut construction in which a blank 1 is provided with an upper face 2, a lower face 3 of which a portion 4 is parallel to the upper face thereof. A central bore 5 extends downwardly through the nut and is threaded as at 6 to engage corresponding threads upon a bolt or other element to which the nut is to be secured. The axis of the bore 5 is illustrated as extending at right angles to the portion 4 of the lower face.

The lower face 3 of the blank 1 is illustrated as having another portion 7 thereof formed at an angle to the portion 5, the angle being indicated at X, the base of which lies at the side 8 constituting one side of the nut blank 1.

Extending laterally and inwardly from the side 8, I have illustrated a slot or opening 9 formed with angular surfaces which join each other at the apex of the angle at 10, the apex of the angle lying immediately above the juncture 11 of the angular portion 7 of the lower face 3 and the parallel portion 4. The angle between the surfaces of the slot or opening 9 is designated by the reference character Y. This angle corresponds exactly to the angle X.

I prefer that the slot 9 be cut into the blank 1 with the bisector 12 of the angle parallel to the portion 7 of the lower face 3 since I have discovered that this arrangement accomplishes the desirable result of causing the greatest spring action on the section 13 of the nut which lies between the slot 9 and the portion 7 of the lower face 3. This spring action is particularly desirable when the nut is to be removed from the bolt since it flexes this portion of the nut back into its original position to thereby loosen the threads 6 from the bolt.

The nut hereinbefore described may readily be manufactured by first forming a bar having a width corresponding to the desired width of the finished nut and having an upper surface thereof forming a right angle with each of the sides thereof. The bar is preferably formed with a lower surface corresponding to the lower surface of the finished nut. That is, the lower surface will have a portion thereof parallel to the upper surface while the other portion thereof is formed upon an outwardly extending angle relative to the first portion.

The bar may then be cut in any well known manner into short sections or blanks of the desired width of the finished nut, after which the blanks may be bored and threaded. The slots 9 may thereafter be cut into the nut from the longer side of the blank so that the finished nut has the appearance illustrated herein.

The operation of my device is substantially as follows:

A self-locking nut constructed in accordance with the preceding description may be readily threaded upon the end of a bolt or other element to which it is to be secured, the threads through the nut permitting the nut to be readily secured down into engagement with the element to be secured.

However, the point of initial contact between the nut and the element to be secured will be at the juncture of the side 8 and the angular portion 7 of the lower face 3 of the nut so that further tightening of the nut will cause the lower section 13 to be moved upwardly relative to the remaining portion of the nut. The amount of motion permitted the lower section 13 is limited by the dimensions of the slot 9 and if properly selected when the nut is secured tightly upon the bolt this slot 9 will be completely closed.

However, it will be observed that upon the upward flexing of the section 13 the threads upon this section will be displaced relative to the remaining threads in the nut so that the nut will in effect be "jammed" upon the bolt to which it is secured. This distortion of the threads will secure the nut against displacement under vibration without the necessity of using any additional securing means such as cotter pins, lockwashers, keys or other similar devices now in use.

When it is desired to remove the nut, the initial turning thereof will cause the elasticity of the material of which the nut is to be made to again extend the portion 13, thus realigning the threads on that portion with the remaining threads so that thereafter the nut may be readily removed from the bolt without injuring the threads upon the bolt.

While I have illustrated and described the preferred embodiment of my invention, I do not desire to be limited to any of the details shown or described herein except as defined in the appended claims.

I claim:

1. A self locking nut comprising a nut body formed of a single piece of resilient material having a lateral slot extending partially therethrough and spaced a substantial distance from the lower face thereof to form a body portion and a relatively heavy leaf spring portion normally deflected downwardly, a bore extending longitudinally through said body and leaf portions, a thread in said bore extending in continuous alinement through both said body portion and said leaf portion to engage a threaded element of a work piece to which the nut is to be applied, said leaf portion having axial distortion solely by abutment against said work piece when said nut is applied to disaline the threads of said body portion and said leaf portion respectively, and movable by its spring action to substantially its initial position to realine the threads when said nut is moved out of said abutting relation.

2. A self locking nut comprising a nut body formed of a single piece of resilient material having a lateral slot of predetermined width extending partially therethrough and spaced a substantial distance from the lower face of said body to form a body portion and a relatively heavy leaf spring portion normally deflected downwardly a distance equal to said predetermined width, a bore extending longitudinally through said body and leaf portions, a thread in said bore extending in continuous alinement through both said body portion and said leaf portion to engage a threaded element of a work piece to which the nut is to be applied, said leaf portion being distortable by abutment against said work piece when said nut is applied through a distance equal to said predetermined width to disaline the threads of said body portion and said leaf portion respectively and removable by its spring action to substantially its initial position to realine the threads when said nut is moved out of said abutting relation.

Signed at Los Angeles, California, this 2d day of February, 1931.

WILLIAM A. BERGSTROM.